No. 836,236. PATENTED NOV. 20, 1906.
W. E. ARNOLD.
EYEGLASS MOUNTING.
APPLICATION FILED JUNE 9, 1903.

Witnesses
E. F. Stewart
Jno. E. Parker

William E. Arnold, Inventor,
by C. A. Snow & Co.
Attorneys

UNITED STATES PATENT OFFICE.

WILLIAM E. ARNOLD, OF JANESVILLE, WISCONSIN.

EYEGLASS-MOUNTING.

No. 836,236.  Specification of Letters Patent.  Patented Nov. 20, 1906.

Application filed June 9, 1903. Serial No. 160,783.

*To all whom it may concern:*

Be it known that I, WILLIAM E. ARNOLD, a citizen of the United States, residing at Janesville, in the county of Rock and State of Wisconsin, have invented a new and useful Eyeglass-Mounting, of which the following is a specification.

This invention relates to certain improvements in eyeglass-mountings, and particularly to that class of eyeglasses having rimless lenses, and has for its principal object to provide a simple and economical form of mounting in which all of the necessary members are formed of a single piece of die-cut metal, thus dispensing with the expense incurred in the manufacture of numerous small parts and the assemblement of such parts to form the desired support for the lenses.

A further object of the invention is to obviate the annoyance incident to the loosening of independent parts—such as nose-guards, studs, or other members—by making the whole of the mounting of a single piece of stamped metal of such construction as to permit all of the adjustments necessary to accommodate physical characteristics of the wearer.

A still further object of the invention is to provide a device of this character to be made and sold as an article of manufacture and of such construction as to permit adjustment necessary to various conditions, a standard-size blank being so made as to admit of its use in connection with rimless lenses of any character and the adjustment required for varying distances between the pupils, as well as the fitting of the mounting to the nose of the wearer and the adjustment of the lenses either toward or from the eye or to permit any required vertical adjustment.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
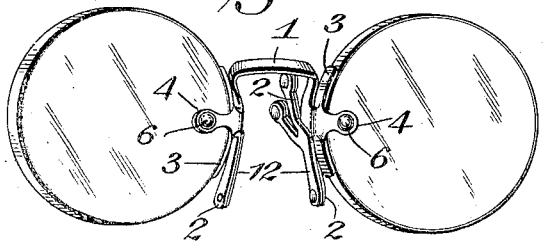
Figure 2:
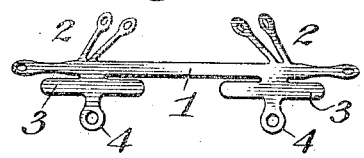
Figure 3:
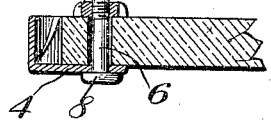

In the accompanying drawings, Figure 1 is a perspective view of an eyeglass-mounting made in accordance with the invention. Fig. 2 is a plan view of the stamped blank in readiness to be bent into position to form the required mounting. Fig. 3 is a detail sectional view illustrating the construction and arrangement of the clamping-screw employed for holding the lenses to the mounting. Figs. 4, 5, 6, 7, 8, and 9 are detail views, partly in the nature of diagrams, illustrating different positions to which portions of the nose-guards may be bent for various adjustments.

Similar numerals of reference are employed to indicate corresponding parts throughout the several figures of the drawings.

Referring first to Fig. 2, 1 designates the bow or nose-bridge; 2 2, the guard elements; 3, the wings which clamp against the inner edge of the lenses; and 4 the studs or posts through which are passed the securing-screws for holding the lenses to the mounting. When a blank of this character is used, the optician first bends the bow or bridge in accordance with the width of the nose and afterward bends down the wings 3 and studs 4 until both are in a plane at about a right angle to the general plane of the strip. The two projecting wing members at each end of the bow are thence twisted slightly until they assume a position at right angles to the stud, or, in other words, are arranged substantially parallel with the lower portions of the bow and the continued lower ends of said bow, which form the lower portions of the nose-guards. The upper nose-guard arms 2 may then be bent, in accordance with the requirements, to any of the positions shown in Figs. 4, 5, 6, 7, 8, and 9 or such other positions as may be required to accommodate the physical characteristics of the wearer.

Figure 4:

In Fig. 4 the upper arms are arranged at a very slight angle to the lower arm of the nose-guard in order to lower the lenses and at the same time move them slightly inward toward the eye.

Figure 5:
Figure 6:

In Fig. 5 the angle of the upper arms is increased in order to move the lenses outward from the eye, and in Fig. 6 these arms are arranged at very nearly a right angle to the lower arm in order to move the lenses still farther out and at the same time upward toward the eye.

Figure 7:
Figure 8:
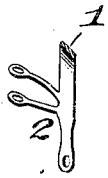
Figure 9:

Intermediate positions are shown in Figs. 7, 8, and 9, and as the arms of the nose-guards are formed of flexible metal they may be twisted to suit the convenience of any person.

The wings 3, as previously described, bear against the inner edges of the two lenses and assist in maintaining the same in proper position, while the said members 4 in place of being double and embracing the edge of each lens extend only on one side of the lens, and the latter are secured in place by screws 6 passing through an opening in the lens and the corresponding opening in the stud. Each pin is provided with an enlarged head 8, which bears against the outer face of the stud, while the inner end of the screw is threaded and is adapted to receive a nut 9 of the character best shown in Fig. 3. Each nut is substantially circular in form and is provided with a threaded opening for the reception of the screw, while on the outer face of each of said nuts are arranged a pair of diametrically-opposed openings for the reception of a wrench, such as 10, having fingers entering the openings and permitting the screwing of the nut against the lens.

The device as described is of exceedingly simple construction and is of such character as to permit the use of a blank of standard size for the support of lenses for all wearers, all of the parts being freely adjustable, the bending operations being accomplished without the necessity of employing tools of special construction.

The device, moreover, obviates the necessity of employing a large number of separate parts held together by screws or similar securing devices which so loosen when the glasses are in constant use, destroying the adjustment of the mounting and at times resulting in the loss of parts.

With a device such as described there may be employed plates formed of compressible material, of horn or other substance, riveted or otherwise secured to the nose-guard members in the manner well known in the art. These plates 12 may be specially made after the arms of the nose-guard have been bent to the required position and when riveted in place will serve as a positive clamp or lock to permanently hold the arms in the adjusted position.

Having thus described the invention, what is claimed is—

1. A single-piece eyeglass-mounting, comprising a bow having its ends continued downward to form the main nose-guard members, lens-clamping wings formed integral with the bow and arranged on lines approximately parallel with the sides of the bow and main nose-guard members, stud members projecting centrally from the lens-clamping wings and provided with openings near their extremities, and a pair of integral arms extending upwardly and rearwardly from the bow at a point approximately opposite the stud members and arranged to engage with the sides of the nose at a point above a horizontal plane which includes the axes of the lenses, the arms and the main nose-guard members springing from a common point at the end of the bow proper, and each being independently adjustable from said point.

2. A blank for eyeglass-mountings formed of a sheet of metal having a central strip bent to form a bow and main nose-guards, arms projecting from one side of the strip to form auxiliary nose-guards, the arms and the main nose-guard each being independently adjustable and bendable from the root or point of connection with the strip, auxiliary strips arranged on that side opposite to the auxiliary arms for the formation of lens-clamping wings, and stud members projecting from the central portion of the auxiliary strips and provided with openings near their extremities.

In testimony that I claim the foregoing as my own I have hereto affixed my signature in the presence of two witnesses.

WILLIAM E. ARNOLD.

Witnesses:
L. M. BROWNELL,
H. D. MURDOCK.